(12) United States Patent
Yamada

(10) Patent No.: US 10,714,959 B2
(45) Date of Patent: Jul. 14, 2020

(54) CHARGER/DISCHARGER

(71) Applicant: MITSUBISHI ELECTRIC CORPORATION, Tokyo (JP)

(72) Inventor: Michio Yamada, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/075,787

(22) PCT Filed: Apr. 13, 2016

(86) PCT No.: PCT/JP2016/061903
§ 371 (c)(1),
(2) Date: Aug. 6, 2018

(87) PCT Pub. No.: WO2017/179153
PCT Pub. Date: Oct. 19, 2017

(65) Prior Publication Data
US 2019/0067973 A1   Feb. 28, 2019

(51) Int. Cl.
*H02J 7/00* (2006.01)
*B60L 53/16* (2019.01)
(Continued)

(52) U.S. Cl.
CPC ............ *H02J 7/0088* (2013.01); *B60L 53/16* (2019.02); *H01R 13/6683* (2013.01);
(Continued)

(58) Field of Classification Search
CPC ........................................................ B60L 53/16
(Continued)

(56) References Cited

U.S. PATENT DOCUMENTS

2013/0169261 A1\* 7/2013 Fendt .................. G01R 31/041
                                                     323/318
2013/0335024 A1  12/2013 Akai et al.
(Continued)

FOREIGN PATENT DOCUMENTS

JP         60-236430 A     11/1985
JP        2003-328812 A    11/2003
(Continued)

*Primary Examiner* — Edward Tso
*Assistant Examiner* — Ahmed H Omar
(74) *Attorney, Agent, or Firm* — Birch, Stewart, Kolasch & Birch, LLP

(57) ABSTRACT

An EV-PCS, which is a charger/discharger, includes: a power converter, which is a charging/discharging unit that controls at least one of charging a storage battery mounted on an EV and discharging the storage battery; a charging/discharging cable extending from the power converter; and a charging/discharging connector for connecting the charging/discharging cable to the EV. The charging/discharging connector includes a temperature detection element having a surface covered with resin, the temperature detection element detecting the internal temperature of the charging/discharging connector. The power converter reduces a value of current flowing to the charging/discharging cable during the charge or discharge of the storage battery as the temperature detected by the temperature detection element rises.

9 Claims, 6 Drawing Sheets

(51) Int. Cl.
*H02J 7/04* (2006.01)
*H01R 13/66* (2006.01)
*H01R 13/68* (2011.01)

(52) U.S. Cl.
CPC .............. *H01R 13/68* (2013.01); *H02J 7/00* (2013.01); *H02J 7/0045* (2013.01); *H02J 7/04* (2013.01); *B60L 2230/12* (2013.01); *B60Y 2200/91* (2013.01)

(58) Field of Classification Search
USPC ........................................................ 320/104
See application file for complete search history.

(56) References Cited

U.S. PATENT DOCUMENTS

| | | |
|---|---|---|
| 2016/0056589 A1 | 2/2016 | Kagawa et al. |
| 2016/0072341 A1* | 3/2016 | Tamura .................... H02J 9/061 307/66 |
| 2016/0288649 A1* | 10/2016 | Ono ........................ B60L 1/006 |

FOREIGN PATENT DOCUMENTS

| | | |
|---|---|---|
| JP | 2005-80490 A | 3/2005 |
| JP | 2011-139572 A | 7/2011 |
| JP | 2012-196120 A | 10/2012 |
| JP | 2014-195385 A | 10/2014 |
| JP | 2014-226014 A | 12/2014 |
| JP | 5704337 B2 | 4/2015 |

* cited by examiner

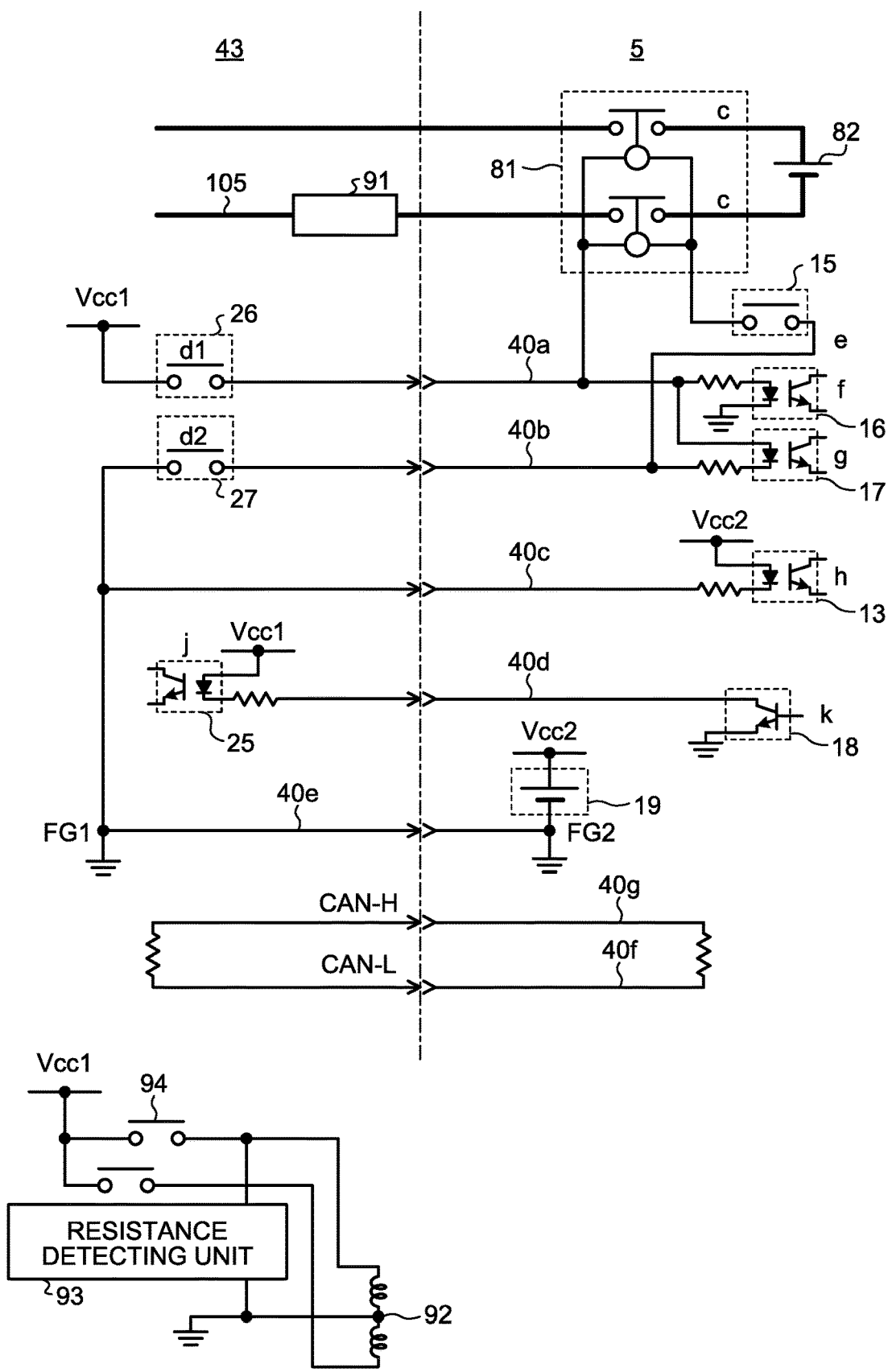

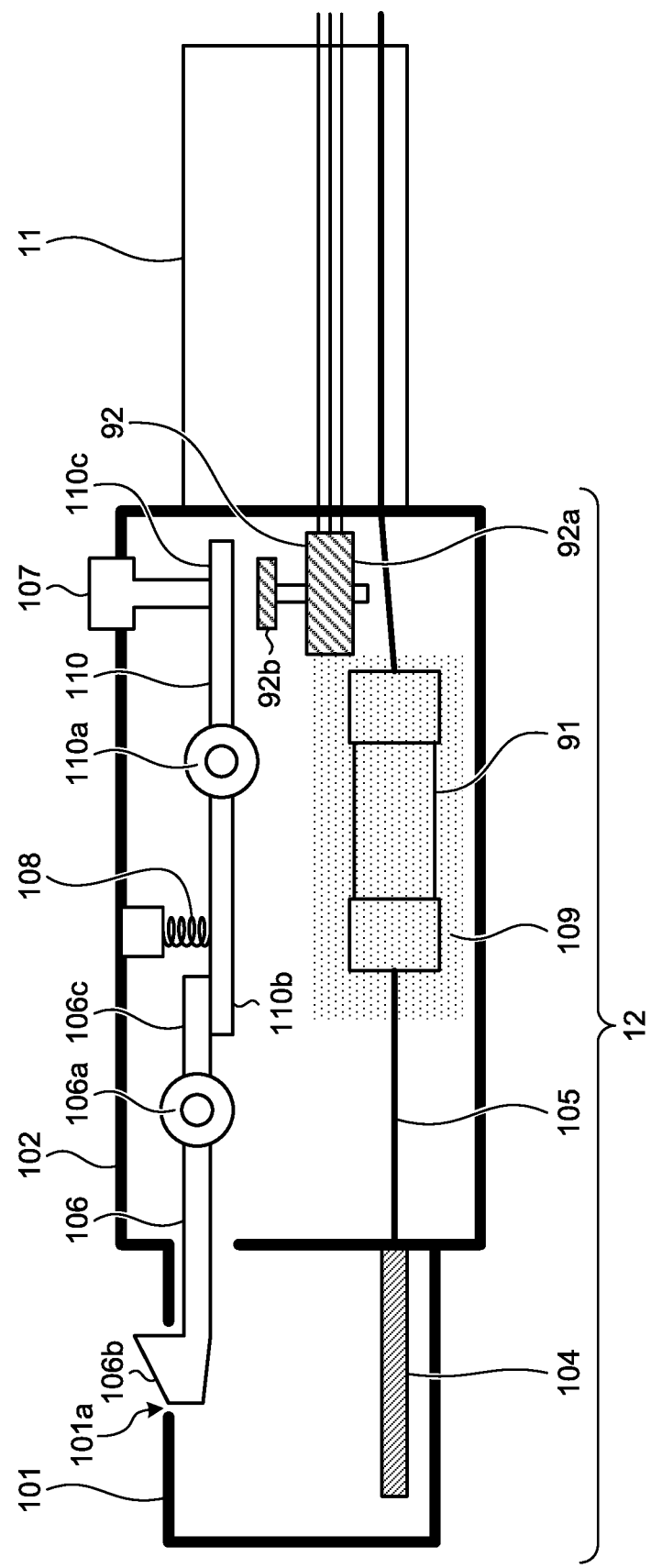

CHARGER/DISCHARGER

FIELD

The present invention relates to a charger/discharger.

BACKGROUND

In recent years, there has been increased demand for a charging/discharging system that supplies electric power from a storage battery mounted on an electric vehicle (EV) to an electric appliance, which is a domestic load, and charges the storage battery mounted on the EV with electric power supplied from a commercial system. When the conventional charging/discharging system charges the storage battery mounted on the EV with the electric power supplied from the commercial system, an EV power conditioner (electric vehicle power conditioning system: EV-PCS) provided as residential equipment converts AC power into DC power, and the DC power is supplied to the EV. When the charging/discharging system supplies electric power stored in the storage battery mounted on the EV to the domestic load, the EV-PCS converts the DC power output from the storage battery mounted on the EV into AC power, and the AC power is supplied to the domestic load.

On the other hand, a cable that interconnects the storage battery mounted on the EV and a power converting device for charging/discharging the storage battery requires protecting means for protecting the cable when an excessively large electric current flows. A current interrupting device disclosed in Patent Literature 1 includes an electric wire connected to a battery, a fuse, which is cable protecting means disposed on the electric wire, and a contactor that cuts off an electric current flowing to the electric wire.

CITATION LIST

Patent Literature

Patent Literature 1: Japanese Patent No. 5704337

SUMMARY

Technical Problem

A charging/discharging cable is desirably thin and light in weight in view of operability of a user. When a light charging/discharging cable having a current-carrying capacity equal to or smaller than a current-carrying capacity for a charging current to an EV is selected placing importance on the operability, unfortunately, a short-circuit protecting device in the EV can fail to achieve short-circuit protection of the cable during the discharge. To establish compatibility between the operability and the short-circuit protection of the cable, it is desirable that a charging/discharging connector connected to a cable terminal provided in the EV is provided with a fuse for protecting the charging/discharging cable. It is also desirable that resin, which is lighter in weight and more excellent in insulation performance than metal, is used for a connector case of the charging/discharging connector. When the resin is used for the connector case, unfortunately, the internal temperature of the connector case tends to rise due to heat generation of electric components inside the connector case because the resin is inferior to metal in thermal conduction performance. Solar radiation facilitates a further rise in the internal temperature of the connector case as the charging/discharging system is set outdoors. The rise in the internal temperature causes a decrease in the life of a fuse element. The conventional charging/discharging system as disclosed in Patent Literature 1, which has the fuse provided inside the connector case, poses a problem of age deterioration of the fuse progressing with the rise in the internal temperature of the connector case.

The present invention has been devised in view of the above, and an object of the present invention is to obtain a charger/discharger that can suppress age deterioration of a fuse in a connector case without deteriorating operability of a charging/discharging cable.

Solution to Problem

To solve the above problem and achieve the object, the present invention provides a charger/discharger including a charging/discharging unit to control at least one of charging a storage battery mounted on a vehicle and discharging the storage battery, the charger/discharger comprising: a cable extending from the charging/discharging unit; and a connector to connect the cable to the vehicle, wherein the connector includes a temperature detection element having a surface covered with resin, the temperature detection element detecting an internal temperature of the connector, and the charging/discharging unit reduces a value of current flowing to the cable during the charge or discharge of the storage battery as the temperature detected by the temperature detection element rises.

Advantageous Effects of Invention

The charger/discharger according to the present invention achieves an effect of suppressing the age deterioration of the fuse in the connector case without deteriorating operability of the charging/discharging cable.

BRIEF DESCRIPTION OF DRAWINGS

FIG. 5 is a diagram illustrating a circuit of an interface section between a power converter and an EV illustrated in FIG. 4.

FIG. 6 is a diagram illustrating a cross section of a charging/discharging connector and a charging/discharging cable used in the charging/discharging system according to the embodiment.

DESCRIPTION OF EMBODIMENT

A charger/discharger according to an embodiment of the present invention is explained in detail below with reference to the drawings. Note that the present invention is not limited by the embodiment.

Embodiment

Figure 1:
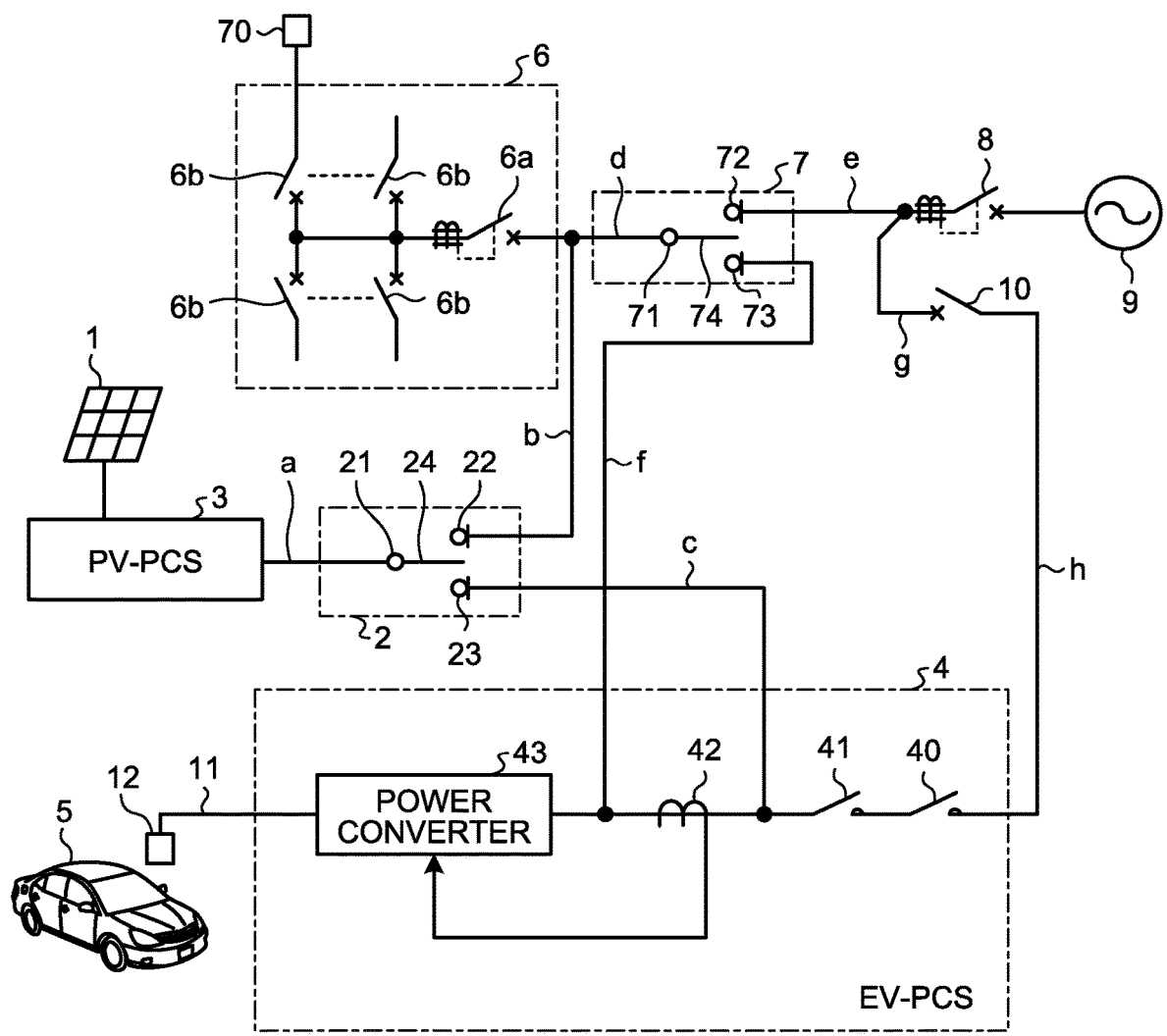
FIG. 1 is a diagram illustrating the configuration of a charging/discharging system including a charger/discharger according to an embodiment.

FIG. 1 is a diagram illustrating the configuration of a charging/discharging system including a charger/discharger according to an embodiment. A charging/discharging system 100 includes a solar battery 1, a diverter switch 2, a solar battery power conditioner (Photo Voltage Power Conditioning System: PV-PCS 3), an EV-PCS 4, an EV 5, which is a vehicle, a residential power distribution panel 6, a diverter switch 7, a master ground-fault circuit interrupter 8, and a maintenance breaker 10. The PV-PCS 3 supplies electric power generated by the solar battery 1 to a commercial system 9, the EV 5, or a domestic load 70. The EV-PCS 4 is a charger/discharger that supplies electric power to a storage battery mounted on the EV 5 or supplies electric power stored in the storage battery to the domestic load 70.

The diverter switch 2 is connected to the PV-PCS 3 via a wire "a". The residential power distribution panel 6 and the diverter switch 7 are connected to the diverter switch 2 via a wire "b". The EV-PCS 4 is connected to the diverter switch 2 via a wire "c". The diverter switch 2 includes a common terminal 21 connected to the wire "a", a terminal 22 connected to the wire "b", a terminal 23 connected to the wire "c", and a contact 24.

The residential power distribution panel 6 includes a master breaker 6a and a plurality of branch breakers 6b connected to the master breaker 6a. The domestic load 70 is connected to each of the branch breakers 6b. In FIG. 1, a single domestic load 70 is illustrated. The domestic load 70 is a device driven by AC power. The domestic load 70 can be, for example, a refrigerator, a luminaire, a cooking appliance, a telephone, a television, or an audio device.

The diverter switch 7 is diverter switching means for interconnecting the master ground-fault circuit interrupter 8 and the residential power distribution panel 6 or interconnecting the EV-PCS 4 and the residential power distribution panel 6. The diverter switch 7 includes a common terminal 71 connected to which wires "b" and "d", a terminal 72 connected to a wire "e", a terminal 73 connected to a wire "f", and a contact 74. The terminal 72 is connected to a secondary side of the master ground-fault circuit interrupter 8 via the wire "e".

The commercial system 9 is connected to a primary side of the master ground-fault circuit interrupter 8. Wires "e" and "g" are connected to the secondary side of the master ground-fault circuit interrupter 8. The wire "g" interconnects the secondary side of the master ground fault circuit interrupter 8 and the primary side of the breaker for maintenance 10.

The maintenance breaker 10 is switching means for interconnecting or disconnecting the master ground-fault circuit interrupter 8 and the EV-PCS 4. During maintenance and inspection of the EV-PCS 4, a wiring path between the master ground fault circuit interrupter 8 and the EV-PCS 4 is opened by the maintenance breaker 10. The secondary side of the maintenance breaker 10 is connected to the EV-PCS 4 via a wire "h".

The EV-PCS 4 includes an overcurrent breaker 40, a parallel-off switch 41, a current transformer 42, and a power converter 43. The parallel-off switch 41 is switching means for disconnecting the commercial system 9 and the EV-PCS 4 when the user selects a shift to autonomous operation during a power failure of the commercial system 9. The power converter 43 is a charging/discharging unit that controls charge/discharge of the storage battery mounted on the EV 5.

The wire "h" is connected to the overcurrent breaker 40. The current transformer 42 is provided for preventing electric power supplied from the EV 5 from flowing back to the commercial system 9. That is, since electric power stored in the storage battery in the EV 5 cannot be sold to the commercial system 9, the current transformer 42 is provided for preventing AC power output from the power converter 43 from flowing into the commercial system 9. The wire "c" is connected between the parallel-off switch 41 and the current transformer 42.

The power converter 43 is bidirectional power converting means. The power converter 43 has a function of converting AC power supplied from the commercial system 9 or the PV-PCS 3 into DC current and outputting the DC current and a function of converting DC power supplied from the EV 5 into AC power and outputting the AC power. The current transformer 42 and the wire "f" are connected to an AC side of the power converter 43. The EV 5 is connected to a DC side of the power converter 43 via a charging/discharging cable 11, which is a cable for charging/discharging. The charging/discharging cable 11 is a cable for transmitting charging/discharging power, a communication signal, and a control power supply between the EV-PCS 4 and the EV 5. A charging/discharging connector 12, which is a connector for charging/discharging the storage battery, is provided at the distal end of the charging/discharging cable 11 for connection to an inlet of the EV 5.

The operation of the charging/discharging system 100 is explained. An operation mode of the charging/discharging system 100 is broadly divided into a charging mode and a discharging mode.

In the charging mode, electric power supplied from the commercial system 9 and electric power supplied from the solar battery 1 can be supplied to the EV 5. When the commercial system 9 is in power failure during the charging mode, the parallel-off switch 41 is opened to thereby disconnect the EV-PCS 4 from the commercial system 9, such that the storage battery mounted on the EV 5 is charged by electric power of the solar battery 1 supplied via the diverter switch 2.

In the discharging mode, usually, a discharging amount of the storage battery mounted on the EV 5 is adjusted in accordance with an amount of power generated by the solar battery 1 and an amount of power consumed by the domestic load 70. A power shortage is made up for through electric power supplied from the commercial system 9.

The EV-PCS 4 can perform seamless charge/discharge, i.e., seamlessly switching the charting mode to the discharging mode or vice versa. During the power failure of the commercial system 9, the EV-PCS 4 adjusts the discharging amount of the storage battery mounted on the EV 5 in accordance with the amount of power generated by the solar battery 1 and the amount of power consumed by the domestic load 70. In this way, an operation mode of performing the seamless charge/discharge and continuing the operation of the domestic load 70 with the electric power supplied from the solar battery 1 and the electric power supplied from the EV 5 when the EV-PCS 4 is disconnected from the commercial system 9 is referred to as autonomous operation mode.

A specific example of the charging mode is explained below. When the commercial system 9 is not in power failure and the EV-PCS 4 is normally operating, states of the diverter switch 2, the diverter switch 7, the master ground-fault circuit interrupter 8, the maintenance breaker 10, and the parallel-off switch 41 are as follows.

(1) The terminal 23 of the diverter switch 2 is connected to the common terminal 21.
(2) The terminal 73 of the diverter switch 7 is connected to the common terminal 71.
(3) The master ground-fault circuit interrupter 8 is closed.
(4) The maintenance breaker 10 is closed.

(5) The parallel-off switch 41 is closed.

In such states, AC power supplied from the commercial system 9 is supplied to the domestic load 70 via the master ground-fault circuit interrupter 8, the maintenance breaker 10, the overcurrent breaker 40, the parallel-off switch 41, the diverter switch 7, the master breaker 6a, and the branch breakers 6b. At this time, the electric power of the commercial system 9 is supplied to an AC output side of the PV-PCS 3 via the diverter switch 2. The PV-PCS 3, which detects the electric power of the commercial system 9, and operates in cooperation with the commercial system.

Meanwhile, the AC power supplied from the commercial system 9 is supplied to the power converter 43 as well via the overcurrent breaker 40 and the parallel-off switch 41. The power converter 43 converts the AC power supplied from the commercial system 9 into DC power. The DC power converted from the AC power is supplied to the storage battery mounted on the EV 5 via the charging/discharging cable 11. Consequently, the storage battery mounted on the EV 5 is charged.

A specific example of the autonomous operation mode is explained below. When the commercial system 9 is in power failure and the EV-PCS 4 is normally operating, states of the diverter switch 2, the diverter switch 7, the master ground-fault circuit interrupter 8, the maintenance breaker 10, and the parallel-off switch 41 is as follows.

(1) The terminal 23 of the diverter switch 2 is connected to the common terminal 21.

(2) The terminal 73 of the diverter switch 7 is connected to the common terminal 71.

(3) The master ground-fault circuit interrupter 8 is closed.

(4) The maintenance breaker 10 is closed.

(5) The parallel-off switch 41 is opened.

When the EV-PCS 4 detects that the commercial system 9 is in power failure, the EV-PCS 4 outputs a command for opening the parallel-off switch 41. Consequently, the EV-PCS 4 and the commercial system 9 are disconnected from each other. Thereafter, the power converter 43, which detects the power failure, converts DC power supplied from the storage battery mounted on the EV 5 into AC power. The AC power converted from the DC power is supplied to the domestic load 70 via the diverter switch 7, the master breaker 6a, and the branch breakers 6b.

The AC power output from the power converter 43 during the autonomous operation is supplied to the AC output side of the PV-PCS 3 as well via the diverter switch 2. The PV-PCS 3, which detects the AC power, determines that the commercial system 9 is restored, and outputs the AC power in cooperation with the AC power output from the power converter 43. Consequently, the electric power generated by the solar battery 1 can be supplied to the domestic load 70.

Power consumption of a typical house is usually 3 kilowatts to 12 kilowatts at single-phase 200 volts. An amount of power generated by the solar battery 1 fluctuates depending upon the area of the roof of the house and a solar radiation amount. In general, the power generation amount is 2 kilowatts to 12 kilowatts. The amount of power generated by the solar battery 1 tends to increase in recent years because of improvement of power conversion efficiency in the solar battery 1 and improvement of a roof structure of the house. Meanwhile, a power capacity of the storage battery mounted on the EV 5, which is 1 kilowatt to 30 kilowatts, tends to dramatically increase because of improvement of battery performance.

Figure 2:
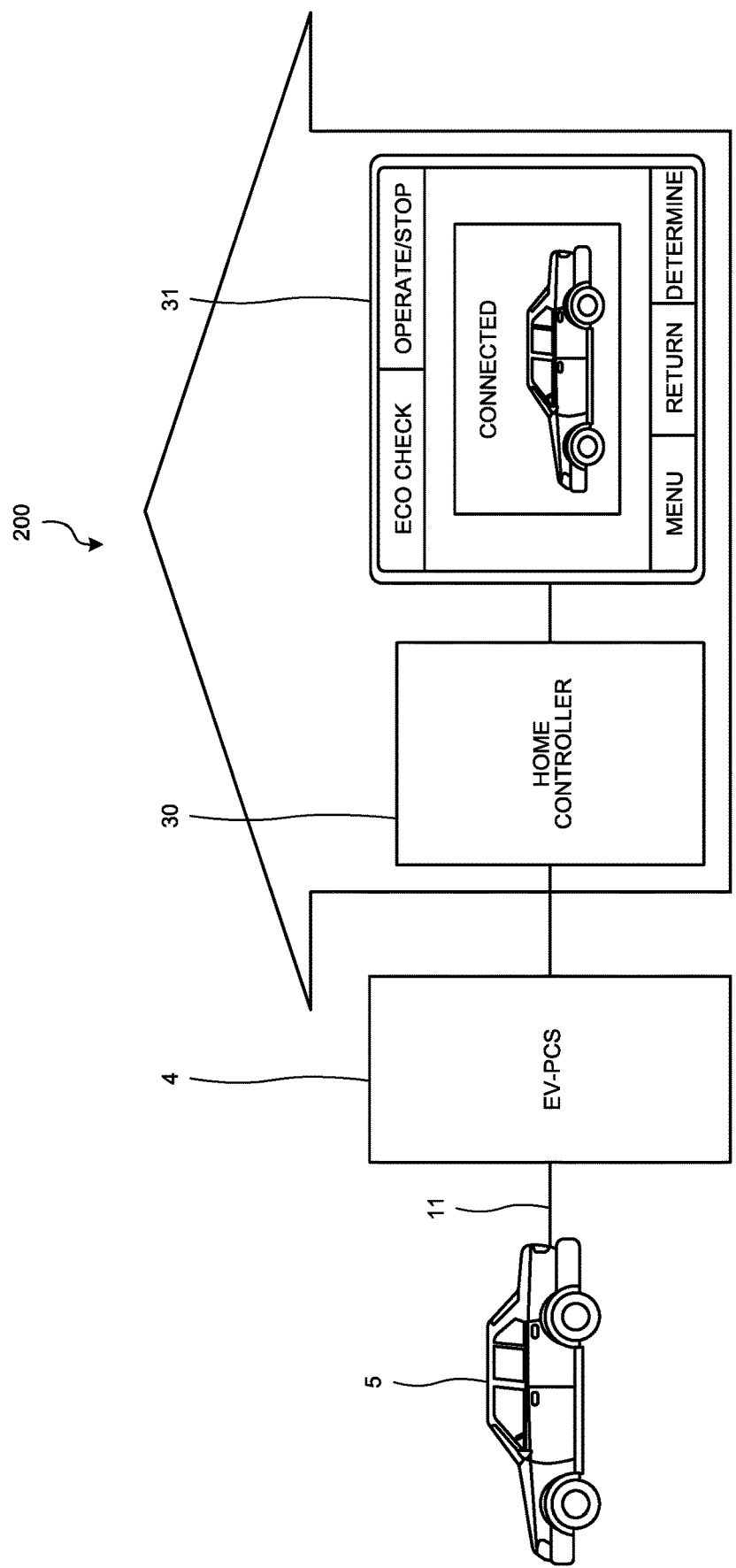
FIG. 2 is a diagram illustrating the configuration of a host system of the charging/discharging system illustrated in FIG. 1.

FIG. 2 is a diagram illustrating the structure of a host system of the charging/discharging system illustrated in FIG. 1. A host system 200 illustrated in FIG. 2 includes a home controller 30 and a home control device 31 that display a state of the EV-PCS 4 and are operated by the user. The home control device 31 is a home energy management system (HEMS) that controls operation states of the EV-PCS 4 and the domestic load 70 in accordance with a state of power consumption of the domestic load 70 connected to the residential power distribution panel 6 and a state of power generation of the PV-PCS 3 illustrated in FIG. 1.

The host system 200 prevents occurrence of unnecessary power consumption in the domestic load 70 and effectively uses residual battery power of the EV 5 when the EV-PCS 4 performs the autonomous operation. As a result, supply of electric power to the domestic load 70 can continue even if the commercial system 9 is in power failure for a long period. This enables the user to continue life with electricity.

Figure 3:
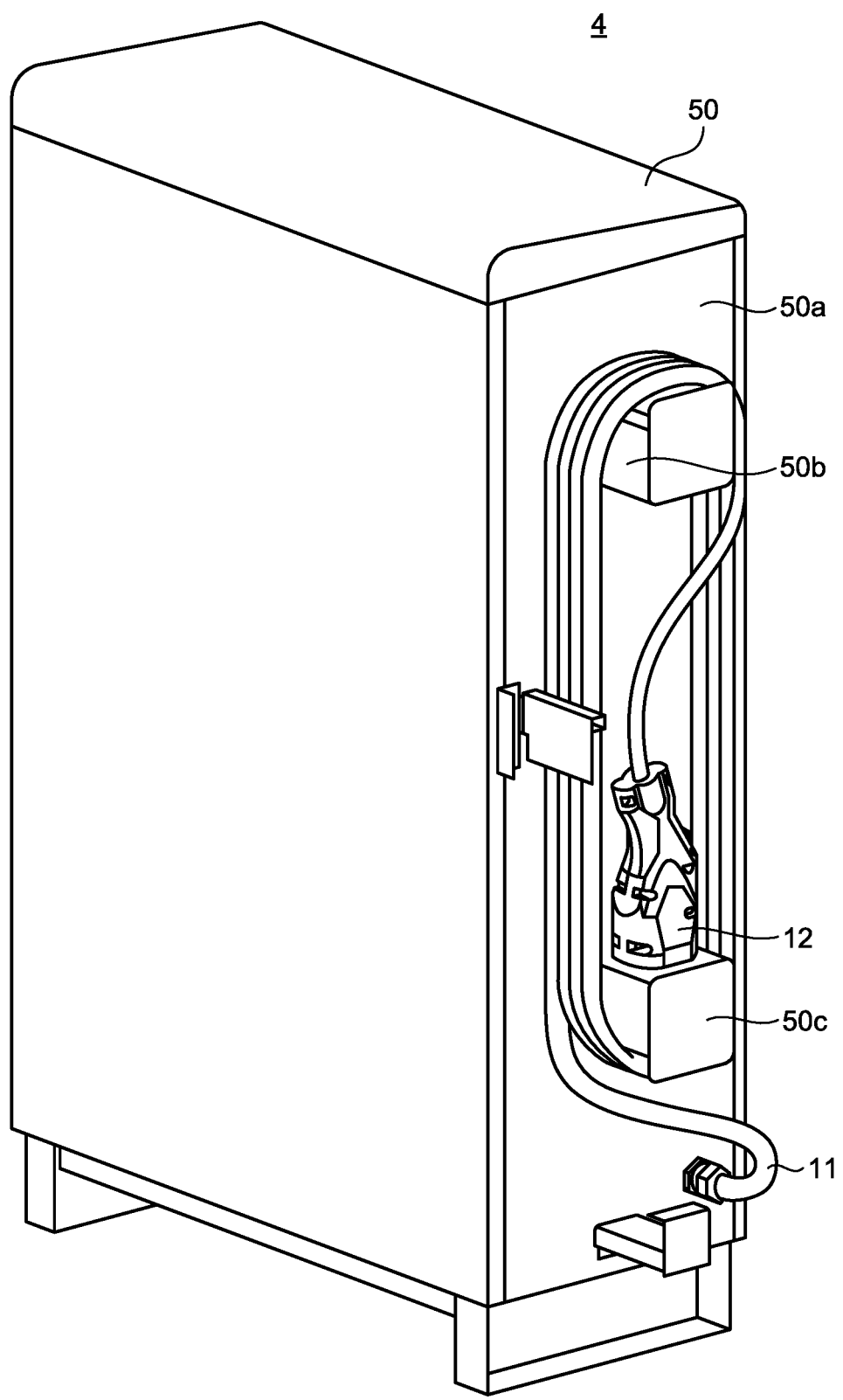
FIG. 3 is a diagram illustrating the charger/discharger according to the embodiment.

FIG. 3 is a diagram illustrating the exterior of the charger/discharger according to the embodiment. FIG. 3 illustrates a housing 50, a pair of holders 50b and 50c, the charging/discharging cable 11, and the charging/discharging connector 12. The housing defines the outer hull of the EV-PCS 4. The pair of holders 50b and 50c is provided on side of a rear surface 50a of the housing. The charging/discharging cable 11 is drawn out from the side of the rear surface 50a of the housing and wound around the holders 50b and 50c. The charging/discharging connector 12 is provided at the end portion of the charging/discharging cable 11. The holders 50b and 50c are holders for holding the charging/discharging cable 11 and the charging/discharging connector 12 when the charging/discharging connector 12 is not connected to the inlet of the EV 5. The charging/discharging cable 11 is wound around the holder 50b and the holder 50c. The holder 50c holds the charging/discharging connector 12.

In performing charging/discharging the storage battery, the user removes the charging/discharging connector 12 from the holders 50b and 50c, unwinds the charging/discharging cable 11 from the housing 50, carries the charging/discharging connector 12 to the vicinity of the EV 5, and inserts the charging/discharging connector 12 into the inlet of the EV 5. After the insertion, the user uses an operation switch of a body of the EV-PCS 4, the home controller 30, or the home control device 31 to cause the EV-PCS 4 to start the charging/discharging operation. After the start of the charging/discharging operation, the EV-PCS 4 automatically seamlessly charges/discharges the EV-PCS 4 in accordance with an operation state of the domestic load 70 connected to the residential power distribution panel 6 or a power generation state of the PV-PCS 3.

When the user uses the EV 5, the user uses the operation switch of the body of the EV-PCS 4, the home controller 30, or the home control device 31 to stop the charging/discharging operation. After the stop of the charging/discharging operation, the user pulls out the charging/discharging connector 12 from the inlet of the EV 5, winds the charging/discharging cable 11 around the holders 50b and 50c, and finally inserts the charging/discharging connector 12 into the holder 50c to fix the charging/discharging connector 12.

The charging/discharging cable 11 is a cabtire cable having each of a plurality of electric wires doubly insulated by a vinyl sheath. The sheath for the cabtire cable may be the vinyl sheath in view of importance being placed on the cost. Alternatively, the sheath for the cabtire cable may be a rubber-made sheath if importance is placed on the wiring operation under low-temperature condition. An internal main power line may be a heat resistant vinyl electric wire of a size of 3.5 sq to 14 sq. Alternatively, the internal main power line may be a heat resistant rubber electric wire if importance is placed on the wiring operation under low-temperature condition.

A cable for quick charging uses a heat resistant rubber electric wire of a size of 22 sq or more. The charging/discharging cable 11 according to this embodiment is a main electric wire cable thinner than the heat resistant rubber electric wire. Such a thinner main electric wire cable is easy to use because the former has its reduced weight and provides improved wiring operation thereof under low-temperature condition.

The charging/discharging cable 11 according to this embodiment, which uses the vinyl sheath, achieves cost reduction. The charging/discharging cable 11 according to this embodiment uses the heat resistant vinyl electric wire of the size of 3.5 sq to 14 sq as the internal main power line. The charging/discharging cable 11 can thus withstand power consumption of 3 kilowatts to 12 kilowatts, which is a total load capacity of the typical home, even when a terminal voltage of the storage battery mounted on the EV 5 is around 200 volts.

Note that the EV-PCS 4 according to this embodiment can also be connected to a Plug-in Hybrid Electric Vehicle (PHEV) rather than to the EV 5. The PHEV, which uses a lithium ion battery (LiB) of the same cells as those in a pure EV, typically includes the reduced number of cells connected in series for the cost reduction. As a result, the PHEV outputs current larger than that of the pure EV when a total battery voltage is lower than a battery voltage of the pure EV and output power is the same as output power of the pure EV. A charging/discharging cable connected to the PHEV needs to have a main power line that is larger in size than a charging/discharging cable connected to the pure EV, but can be thinner than the main power line used in the quick charging cable.

Resin having incombustibility and insulation is used for the exterior of the charging/discharging connector 12. Consequently, the weight of not only the charging/discharging cable 11 but also the charging/discharging connector 12 can be reduced. The use of resin for the exterior of the charging/discharging connector 12 allows an user to less feel his hand cold when the user uses the charging/discharging connector 12 in winter. Compared with metal, the resin can be mass produced if only a mold can be prepared. It is thus expected that the resin will spread to ordinary households in a large quantity. Therefore, the charging/discharging connector 12 having its exterior made of resin is compatible with the charging/discharging system 100 that uses the EV 5 having a total load capacity of 3 kilowatts to 12 kilowatts.

For the EV-PCS 4 configured in this way, the user uses the charging/discharging cable 11 and the charging/discharging connector 12 whenever the user uses the EV 5. The charging/discharging cable 11 according to this embodiment uses the charging/discharging connector 12 thinner and lighter than the cable for quick charging, such that the user can readily handle the charging/discharging cable 11.

Figure 4:
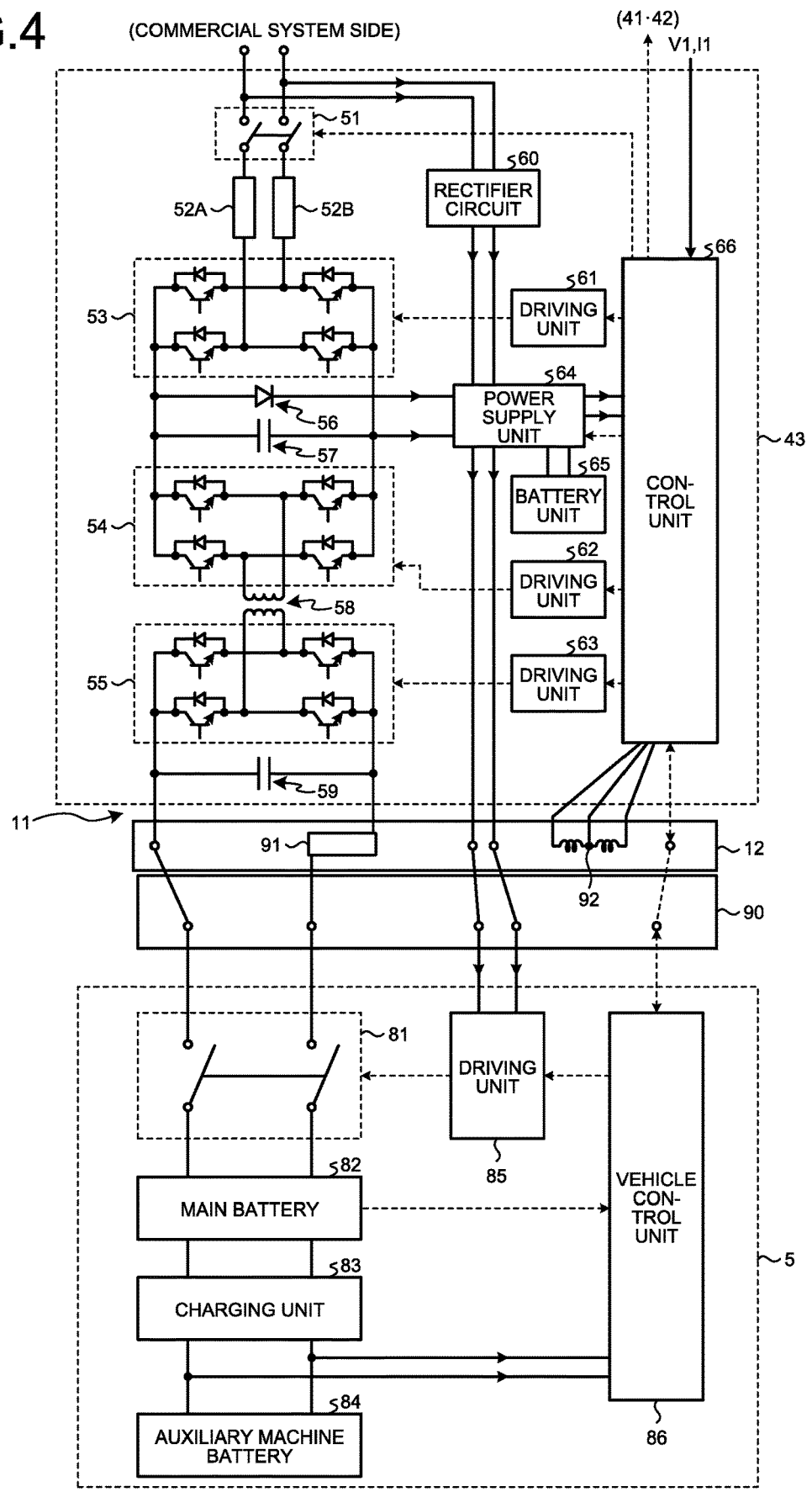
FIG. 4 is a diagram illustrating a main circuit of the charging/discharging system according to the embodiment.

FIG. 4 is a diagram illustrating a main circuit of the charging/discharging system according to the embodiment. The EV 5 includes an inlet 90, a contact 81 connected to the inlet 90, a main battery 82, which is an LiB, a charging unit 83, an auxiliary machine battery 84, a driving unit 85 connected to the inlet 90 to drive the contact 81, and a vehicle control unit 86. The contact 81 is a contactor that interconnects the main battery 82 and the inlet 90 or disconnects the main battery 82 and the inlet 90 from each other. The charging unit 83 charges the main battery 82 with electric power discharged from the auxiliary machine battery 84, electric power regenerated by a motor for driving of the EV 5, and electric power received by an AC external input for normal charging. The driving unit 85 opens/closes the contact 81 by a control power supply supplied from the EV-PCS 4, a control power supply, and a control signal supplied from the vehicle control unit 86.

A fuse 91 and a solenoid 92, which is a temperature detection element, are incorporated in the charging/discharging connector 12. When only the power line of the cabtire cable, which is the charging/discharging cable 11, is cut or when the side of the EV 5 is short-circuited, the fuse 91 protects the electric wire from burnout before the contact 81 on the EV 5 interrupts the main battery 82 due to communication abnormality. The charging/discharging system 100, which supplies or receives electric power using a quick charging terminal of the EV 5, uses the charging/discharging cable 11 thinner and lighter than the quick charging cable, in view of importance being placed on operability of the user. The fuse 91 cuts off a short-circuit current flowing when the short circuit occurs, which protects the electric wire from burnout.

The power converter 43 incorporates a main circuit and a control function of the EV-PCS 4. FIG. 4 illustrates the main circuit and the control function of the EV-PCS 4, which are provided inside the power converter 43. Alternatively, the main circuit and the control function of the EV-PCS 4 may be provided other than the power converter 43 provided the main circuit and the control function are within the EV-PCS 4.

The power converter 43 includes a system interconnection relay 51, reactors 52A and 52B, inverter main circuits 53, 54, and 55, and a diode 56. The relay 51 opens and closes to allow or disallow supply of AC power from the commercial system 9. The inverter main circuits 53, 54, and 55 include a plurality of semiconductor switches for converting DC power into AC power. The diode 56 has an anode connected to a DC bus between the inverter main circuit 53 and the inverter main circuit 54, and a cathode connected to a power supply unit 64, such that an electric current flowing in the DC bus is input to the power supply unit 64.

The power converter 43 includes a capacitor 57, inverter main circuits 53, 54, and 55, a high-frequency insulation transformer 58 interposed between the inverter main circuit 54 and the inverter main circuit 55, and a capacitor 59 disposed between the inverter main circuit 55 and the charging/discharging cable 11. One end of the capacitor 57 is connected to the DC bus and the other end of the capacitor 57 is connected to the power supply unit 64, such that a DC bus voltage is smoothed and input to the power supply unit 64.

The inverter main circuit 54, the inverter main circuit 55, and the high-frequency insulation transformer 58 define a bidirectional converter circuit. The bidirectional converter circuit seamlessly supplies electric power output from the inverter main circuit 54 to the EV 5 while insulating the inverter main circuit 54 and the inverter main circuit 55 from each other. The capacitor 59 smooths a voltage applied to the bidirectional converter.

The power converter 43 includes a rectifier circuit 60, three driving units 61, 62, and 63, and a control unit 66. The rectifier circuit 60 converts AC power supplied from the commercial system 9 into DC power and supplies the DC power to the power supply unit 64. The three driving units 61, 62, and 63 drive the inverter main circuits 53, 54, and 55, respectively. In accordance with a control signal output from the control unit 66, each of the three driving units 61, 62, and 63 drives a semiconductor switch defined by a corresponding one of the three inverter main circuits 53, 54, and 55.

The power converter 43 includes a battery unit 65. The battery unit 65 provides a control power supply for controlling the driving units 61, 62, and 63, the control unit 66, the driving unit 85 in the EV 5, and the parallel-off switch 41 illustrated in FIG. 1 during power failure of the commercial system 9. This configuration allows the charging/discharging system 100 not only to normally operate in cooperation with the commercial system 9 but also to open the contact of the parallel-off switch 41 illustrated in FIG. 1 and close the contact 81 to thereby provide an autonomous operation system during power failure of the commercial system 9.

The control unit 66 controls a bidirectional converter circuit defined by the inverter main circuit 55 and the high-frequency insulation transformer 58. The control unit 66 communicates with the vehicle control unit 86 in the EV 5 via the charging/discharging cable 11, the charging/discharging connector 12, and the inlet 90. The control unit 66 communicates with the vehicle control unit 86 to thereby control the charge/discharge of the main battery 82, and achieve power control depending upon load fluctuation in the house and fluctuation in a power amount generated by the solar battery 1.

The solenoid 92 includes a setting coil for locking the charging/discharging connector 12 connected to the inlet 90 to prevent the connected connector 12 from being removed by the user during the charge/discharge and a resetting coil for unlocking the charging/discharging connector 12. These coils are energized and controlled by the control unit 66. By virtue of the solenoid 92, a mechanical operation state is maintained even when the charging/discharging cable 11 is cut and a control signal output from the control unit 66 disappears.

FIG. 5 is a diagram illustrating a circuit of an interface section between the power converter and the EV illustrated in FIG. 4. The left side of FIG. 5 illustrates circuits provided in the power converter 43 and the charging/discharging connector 12 illustrated in FIG. 1. The right side of FIG. 5 illustrates a circuit provided in the EV 5 illustrated in FIG. 1. A control power supply Vcc1 is a power supply supplied from the EV-PCS 4 illustrated in FIG. 1. A control power supply Vcc2 is a power supply supplied from the vehicle control unit 86 illustrated in FIG. 4. The control power supplies Vcc1 and Vcc2 are, for example, 12 volts.

A circuit diagram on the upper side of FIG. 5 includes one end of a switch 26 for starting the charge/discharge being connected to the control power supply Vcc1. One end of a first charging start/stop line 40a is connected to the other end of the switch 26. The other end of the first charging start/stop line 40a is connected via a resistor to an anode of a diode disposed on the primary side of a photocoupler 16. A cathode of the diode is grounded.

Two solenoids that drive two switches of the contact 81 in one-to-one correspondence are connected to the other end side of the first charging start/stop line 40a. Further, an anode of a diode disposed on the primary side of a photocoupler 17 is connected to the other end side of the first charging start/stop line 40a.

One end of the switch 15 is connected to each of the two solenoids. The switch 15 that drives the contact 81 is provided in the driving unit 85 illustrated in FIG. 4. The other end of the switch 15 is connected to one end side of a second charging start/stop line 40b and connected via a resistor to a cathode of a diode disposed on the primary side of the photocoupler 17.

The other end of the second charging start/stop line 40b is connected to one end of a switch 27 for starting the charge/discharge. The other end of the switch 27 is connected to a ground FG1 on a side of the power converter 43, to one end of a connector connection confirmation line 40c, and to one end of a ground line 40e in the charging/discharging connector 12.

The other end of the connector connection confirmation line 40c is connected via a resistor to a cathode of a diode disposed on the primary side of a photocoupler 13. An anode of the diode is connected to the control power supply Vcc2.

The other end of the ground line 40e is connected to a negative electrode of a control power supply 19 and connected to a ground FG2 on a side of the EV 5. The control power supply 19 is a power supply supplied from the auxiliary machine battery 84 illustrated in FIG. 4. The control power supply 19 is, for example, 12 volts.

One end of a charging permission/prohibition line 40d is connected to a drain of a transistor 18. An emitter of the transistor 18 is grounded. One end of the charging permission/prohibition line 40d is connected via a resistor to a cathode of a diode on the primary side of a photocoupler 25. An anode of the diode is connected to the control power supply Vcc1.

In accordance with a charging signal output from the vehicle control unit 86 illustrated in FIG. 4, the transistor 18 carries an electric current to the diode on the primary side of the photocoupler 25 on the side of the EV-PCS 4 or stops the flow of electric current to the diode to thereby control permission of the charge/discharge from the side of the EV 5 to the EV-PCS 4. The photocoupler 25 disposed on the side of the power converter 43 "insulates" a signal of charging/discharging permission and prohibition output from the EV 5 in transmitting the signal to the control unit 66 illustrated in FIG. 4.

In this configuration, the switches 26 and 27 for starting the charge/discharge on the side of the power converter 43 and the switch 15 are closed, thereby closing the contact 81. Consequently, a voltage of the main battery 82 is applied to the inlet 90 to provide a chargeable/dischargeable state.

The photocoupler 13 for confirming connection of the charging/discharging connector 12 allows an electric current to flow from the diode on the primary side of the photocoupler 13 through the connector connection confirmation line 40c, the ground FG1 on the side of the power converter 43, and the ground line 40e to the ground FG2 of the EV 5 when the charging/discharging connector 12 is connected to the photocoupler 13. This causes the diode on the primary side of the photocoupler to emit light, such that information indicative of connection of the charging/discharging connector 12 is transmitted to the vehicle control unit 86 illustrated in FIG. 4.

The photocouplers 16 and 17 "insulate" a charge/discharge start signal output from the EV-PCS 4 and transmit the signal to the vehicle control unit 86 of the EV 5.

Controller Area Network (CAN) communication lines 40g and 40f are used for data transfer between the power converter 43 and the EV 5. The power converter 43 and the EV 5 transmit voltage information via the CAN communication lines 40g and 40f to each other. The power converter 43 and the EV 5 uses the CAN communication line 40g and 40f and hardware for implementing confirmation of connector connection, charging/discharging permission, charging/discharging prohibition, a charting/discharging start, and a charting/discharging stop, thereby detecting disconnection or short-circuiting of the charging/discharging cable 11 and further detecting multiple abnormalities of a device. Consequently, the power converter 43 and the EV 5 can stop mutual energization of devices and protect the devices.

An electromagnetic switch 94 controls an energizing current to the solenoid 92. In order to prevent the energized charging/discharging connector 12 from coming off, the electromagnetic switch 94 energizes the setting coil of the solenoid 92 for a short period of time immediately before energization of the connector 12 starts. Consequently, the charging/discharging connector 12 and the inlet 90 are locked together, and the user cannot remove the charging/discharging connector 12. Even if a power supply of the solenoid 92 is "lost" (i.e., the power supply becomes an off state to stop energizing the solenoid 92) under such a condition, the locked state is maintained.

When the charge/discharge is completed and the user removes the charging/discharging connector 12, the user stops the charge/discharge, using the operation switch of the main body of the EV-PCS 4, the home controller 30, or the home control device 31. After the stop of the charge/discharge, the electromagnetic switch 94 energizes the resetting coil of the solenoid 92 for a short period of time immediately after the energization of the connector 12 terminates. Consequently, the charging/discharging connector 12 is unlocked to allow the user to remove the charging/discharging connector 12 from the inlet 90. This operation suppresses heat generation in the charging/discharging connector 12 because an electric current does not flow through the solenoid 92 at a time other than the time of the charge/discharge, that is, the time of the start of and the stop of the charge/discharge.

A resistance detecting unit 93 detects a resistance value of the coil of the solenoid 92. Since the solenoid 92 is not energized during the charge/discharge as explained above, the solenoid 92 itself does not generate heat. The resistance value of the coil depends on the ambient temperature around the coil, that is, on the internal temperature of the charging/discharging connector 12. The resistance value detected by the resistance detecting unit 93 is transmitted to the control unit 66 illustrated in FIG. 4. When the resistance value of the coil changes, that is, the resistance value of the coil increases as the ambient temperature around the coil rises or temperature rises due to the energization of the coil, the control unit 66 reduces a charging/discharging amount. As a result, the internal temperature of the charging/discharging connector 12 is reduced, and the life of the fuse 91 can be extended. Further, since there is no need for additional elements, circuits, and cables for detection of the internal temperature of the charging/discharging connector 12, the charging/discharging connector 12 and the charging/discharging cable 11 are light in weight and easy to use and provide improved reliability of the power converter 43 as compared with when these components are used.

FIG. 6 is a diagram illustrating a cross section of the charging/discharging connector and the charging/discharging cable used in the charging/discharging system according to the embodiment. The charging/discharging connector 12 includes a housing 101 arranged to fit in the inlet 90 of the EV 5 illustrated in FIG. 4 and a connector case 102 disposed between the housing 101 and the charging/discharging cable 11. The charging/discharging connector 12 includes a metal-made connector pin 104 fixed to the inside of the housing 101 and connected to a main power line 105 inside the connector case 102.

The connector case 102 is made of resin having incombustibility, insulation, fall resistance, and chemical resistance. For a typical quick charging connector, a connector case defining an outer hull of the connector is often made of metal. The quick charging connector is heavier than the resin-made connector case. For the charging/discharging connector 12 according to this embodiment, the connector case 102 is made of resin and the inside of the connector case 102 is hollow. Thus, the charging/discharging connector 12 is lighter in weight than the connector made of metal.

When the housing 101 is inserted into the inlet 90 of the EV 5, the connector pin 104 comes into contact with a metal electrode provided on a side of the inlet 90. Consequently, the metal electrode provided on the side of the inlet 90 and the main power line 105 are connected to each other via the connector pin 104. For the main power line 105, a heat resistant vinyl electric wire of a size of 3.5 sq to 14 sq is used. The main power line 105 is a part of a plurality of internal wires of the charging/discharging cable 11. The end portion of the main power line 105 is inserted into the connector case 102.

The connector pin 104 is crimped to the distal end of the main power line 105. The fuse 91 is solder-connected to the main power line 105. Since the main power line 105 is connected to the connector pin 104, a charging/discharging current flows between the main circuit of the power converter 43 and the charging unit 83 of the EV 5.

The charging/discharging connector 12 includes a latch 106, an unlatch button 107, a spring 108, and a lever 110. The latch 106 is provided inside the connector case 102 in such a manner as to turn on a support shaft 106a. A spring 108 is provided inside the connector case 102. The lever 110 is provided inside the connector case 102 in such a manner as to turn on a support shaft 110a in response to a movement of the unlatch button 107.

The latch 106 has a projecting portion 106b formed on one end side thereof. FIG. 6 illustrates the projecting section 106b entering an opening portion 101a formed through the housing 101. The projecting portion 106b has an end that is wedge-shaped to fit in the inlet 90 illustrated in FIG. 4. The other end 106c of the latch 106 is in contact with one end 110b of the lever 110. The side of the one end 110b of the lever 110 is urged by the spring 108. The other end 110c of the lever 110 is in contact with the unlatch button 107.

When the user inserts the charging/discharging connector 12 into the inlet 90, an inclined surface of the projecting portion 106b of the latch 106 comes into contact with the inlet 90, such that the latch 106 turns counterclockwise. At this time, the lever 110 connected to the latch 106 turns clockwise against an urging force of the spring 108. Consequently, the housing 101 fits in the inlet 90 without the projecting portion 106b of the latch 106 being caught by the inlet 90.

The charging/discharging connector 12 cannot be directly removed, because the projecting portion 106b of the latch 106 is caught by a recessed portion formed in the inlet 90 when the insertion of the housing 101 into the inlet 90 is completed. To remove the charging/discharging connector 12, the user depresses the unlatch button 107, thereby causing the lever 110 to turn clockwise against the urging force of the spring 108, such that the latch 106 pushed by the lever 110 turns counterclockwise. Consequently, the projecting section 106b is released from fitting engagement with the inlet 90.

For the charging/discharging connector 12 according to this embodiment, the solenoid 92, which is provided inside the charging/discharging connector 12, faces the unlatch button 107. The solenoid 92 has its surface covered with resin and is an example of a temperature detection element for detecting the internal temperature of the charging/discharging connector 12. In this embodiment, the setting coil and the resetting coil of the solenoid 92 are covered with resin. The solenoid 92 illustrated in FIG. 6 includes a housing 92a formed of the resin and a movable piece 92b provided on the housing 92a. The movable piece 92b is a movable member that advances or retracts in a direction toward or away from the lever 110 upon the energization of the coil.

The movable piece 92b is disposed facing the other end 110c of the lever 110. When the setting coil is energized, the movable piece 92b is pushed toward the lever 110. When the resetting coil is energized, the movable piece 92b is pulled back in a direction opposite to the lever 110.

When the movable piece 92b moves to the setting position, the movable piece 92b is pressed against the other end 110c of the lever 110. As a result, the user can neither depress the unlatch button 107 nor remove the charging/discharging connector 12.

On the other hand, when the movable piece 92b moves to the resetting position, a gap is formed between the other end 110c of the lever 110 and the movable piece 92b as in an illustrated example. As a result, the user can depress the unlatch button 107 and remove the charging/discharging connector 12.

The outer circumferential surface of the fuse 91 is covered with thermally conductive resin 109, which is a heat radiation member. The outer circumferential surface of the thermally conductive resin 109 is in contact with the housing 92a of the solenoid 92 incorporating the coils. The thermally conductive resin 109 reduces heat resistance between the fuse 91 and the solenoid 92 and reduces a temperature difference between the fuse 91 and the solenoid 92. Consequently, accuracy of temperature detection by the solenoid 92 can be improved. With this configuration, the EV-PCS 4 accurately detects the temperature of the fuse 91 and controls a charging/discharging current on the basis of the detected temperature. The life of the fuse abruptly decreases as the ambient temperature around the fuse rises. According to this embodiment, a temperature rise of the fuse 91 is suppressed to thereby increase the life of the fuse 91 greatly.

Since the EV-PCS 4 according to this embodiment detects the temperature by using resistance values of the coils of the solenoid 92, it is unnecessary to newly provide a temperature detection element in the charging/discharging connector 12. Further, since it is unnecessary to lay a wire for the temperature detection element in the charging/discharging cable 11, the charging/discharging connector 12 and the charging/discharging cable 11 can be reduced in weight. Since the number of wires in the charging/discharging cable 11 decreases, the charging/discharging cable 11 can be thinner, thereby achieving the easy-to-handle EV-PCS 4.

Although this embodiment has been described as to an example in which the internal temperature of the charging/discharging connector 12 is detected from a change in the resistance values of the coils of the solenoid 92 to control the charging/discharging current, the same effects can be obtained using a temperature detection element such as a thermocouple or a thermistor instead of the coils. When such a temperature detection element is used, the number of cables increases compared with when the solenoid 92 is used. However, the accuracy of temperature detection is improved compared with when the solenoid 92 is used.

For the conventional EV charging/discharging system for the typical house, the case of the charging/discharging connector is made of resin and thus has its lower performance of heat radiation inside and the outside the charging/discharging connector as compared with a metal-made case. As a result, the internal temperature of the charging/discharging connector tends to be high. The heat radiation characteristic can be improved by providing a hole in the case for the purpose of radiating heat in the case. Unfortunately, this approach poses a problem. That is, since a high-voltage charging unit and a mechanical component for locking or unlocking the charging/discharging connector are disposed inside the charging/discharging connector, there is a concern about the failure of operation of the mechanical unit and deterioration in insulation performance due to intrusion of dust, metal pieces, and insects into the inside of the connector. The EV-PCS 4 according to this embodiment suppresses heat generation of the fuse 91 by detecting the internal temperature of the charging/discharging connector 12 and performing charging/discharging current control for reducing a value of current flowing through the charging/discharging cable 11 during the charge or discharge as the detected temperature rises. It is thus unnecessary to provide an opening for heat radiation in the charging/discharging connector 12 or, if any, the opening can be reduced in size. As a result, dust, metal pieces, and insects less easily intrude into the inside of the charging/discharging connector 12, thereby improving the insulation performance and preventing the non-operation of the mechanical unit.

Since dust, metal pieces, and insects less easily intrude into the inside of the charging/discharging connector 12, maintenance such as disassembly and cleaning of the charging/discharging connector 12 is also unnecessary. Therefore, the EV-PCS 4 according to this embodiment can provide a high effect in the charging-discharging system for the typical house in which maintenance cannot be frequently performed.

Repetitious heating of the fuse 91 even at a low temperature causes crystallization of a fusible element tissue in an element to progress, which cracks a crystal interface. This phenomenon is a cause of a reduction in the life of the fuse 91. In this embodiment, the ambient temperature around the element of the fuse 91 can be reduced to thereby provide the power converter 43 and the charging/discharging system 100 with long lives.

The conventional charging/discharging system selects a fuse 91 having a large fusing current with respect to a rated current during a normal operation on the assumption that the life of the fuse decreases due to the progress of the crystallization of the fusible element tissue in the fuse element. The EV-PCS 4 according to this embodiment can detect the internal temperature of the charging/discharging connector 12 without adding a new element to the charging/discharging connector 12 and suppress a rise in the internal temperature of the charging/discharging connector 12. Therefore, the progress of the crystallization of the fusible element tissue in the element is prevented to thereby relatively reduce a maximum current flowing through the fuse 91. It is thus possible to use a fuse having a small fusing current.

A charging/discharging cable of a residential charging/discharging system has an electric wire diameter selected in correspondence to a fusing current during short-circuiting rather than a rated current during a normal operation. This means that an electric wire selected for the charging/discharging cable of the residential charging/discharging system has a large wire diameter. The selection of the electric wire having the large diameter increases the weight of the charging/discharging cable, which results in the charging/discharging cable being hard to lay. Since the EV-PCS 4 according to this embodiment can reduce a breaking current, the fuse 91 having a small breaking current and the thin and light charging/discharging cable 11 can be used. It is thus possible to provide the charging/discharging system 100 with the charging/discharging cable 11 easily handled by a general user.

Since the periphery of the fuse 91 is covered with the resin, which is the heat radiation member in this embodiment, the connector case 102 touched by the user is doubly insulated from the fuse 91. It is thus possible to provide the EV-PCS 4 and the charging/discharging system 100 with high electric safety.

In this embodiment, the resin is used for the connector case in view of importance being placed on cost and mass productivity. However, the same effects can be obtained when a connector case made of metal having a small strength to weight ratio such as aluminum or titanium is used. The use of such a metal connector case not only makes the charging/discharging cable 11 light in weight and easy to lay, but also provides the EV-PCS 4 and the charging/discharging system 100 with the improved heat radiation performance and longer life.

The configurations explained above in the embodiment indicate examples of the content of the present invention. The configurations can be combined with other publicly-known technologies. A part of the configurations can be omitted or changed in a range not departing from the spirit of the present invention.

REFERENCE SIGNS LIST 1 solar battery; 2, 7 diverter switch; 4 EV-PCS; 5 EV; 6 residential power distribution panel; 6a master breaker; 6b branch breaker; 8 master ground fault circuit interrupter; 9 commercial system; 10 breaker for maintenance; 11 charging/discharging cable; 12 charging/discharging connector; 15, 26, 27 switch; 13, 16, 17, 25 photocoupler; 18 transistor; 19 power supply for control; 21, 71 common terminal; 22, 23, 72, 73 terminal; 24, 74 contact; 30 home controller; 31 home control device; 40 overcurrent breaker; 40a first charging start/stop line; 40b second charging start/stop line; 40c connector connection confirmation line; 40d charging permission/prohibition line; 40e ground line; 40f, 40g communication line; 41 parallel-off switch; 42 current transformer; 43 power converter; 50 housing; 50a rear surface; 50b, 50c holder; 51 system cooperative relay; 52A, 52B reactor; 53, 54, 55 inverter main circuit; 56 diode; 57, 59 capacitor; 58 high-frequency insulation transformer; 60 rectifier circuit; 61, 62, 63 driving unit; 64 power supply unit; 65 battery unit; 66 control unit; 70 domestic load; 81 contact; 82 main battery; 83 charging unit; 84 auxiliary machine battery; 85 driving unit; 86 vehicle control unit; 90 inlet; 91 fuse; 92 solenoid; 92a housing; 92b movable piece; 93 resistance detecting unit; 94 electromagnetic switch; 100 charging/discharging system; 101 housing; 101a opening section; 102 connector case; 104 connector pin; 105 main power line; 106 latch; 106a support shaft; 106b projecting section; 106c other end; 107 unlatch button; 108 spring; 109 thermally conductive resin; 110 lever; 110a support shaft; 110b one end, 110c other end; 200 host system.

The invention claimed is:

1. A charger/discharger including a charging/discharging unit to control at least one of charging a storage battery mounted on a vehicle and discharging the storage battery, the charger/discharger comprising:
a cable extending from the charging/discharging unit; and
a connector to connect the cable to the vehicle, wherein
the connector includes a solenoid having a surface covered with resin, the solenoid being configured as a temperature detection element detecting an internal temperature of the connector, the solenoid having a coil to lock the connector connected to the vehicle to prevent removal of the connector from the vehicle during the charge or discharge of the storage battery, the solenoid keeping the connector locked after a power supply of the coil is lost after the connector is locked, and
the charging/discharging unit reduces a value of current flowing to the cable during the charge or discharge of the storage battery as the temperature detected by the solenoid rises.

2. The charger/discharger according to claim 1, wherein the solenoid detects the internal temperature of the connector from a change in a resistance value of the coil.

3. The charger/discharger according to claim 1, wherein a fuse is provided inside the connector, and
the fuse is covered with a heat radiation member.

4. The charger/discharger according to claim 1, wherein a connector case of the connector is made of metal.

5. The charger/discharger according to claim 2, wherein a fuse is provided inside the connector, and
the fuse is covered with a heat radiation member.

6. The charger/discharger according to claim 2, wherein a connector case of the connector is made of metal.

7. The charger/discharger according to claim 3, wherein a connector case of the connector is made of metal.

8. The charger/discharger according to claim 5, wherein a connector case of the connector is made of metal.

9. The charger/discharger according to claim 1, wherein a connector case of the connector is made of resin.

* * * * *